Figure 4:
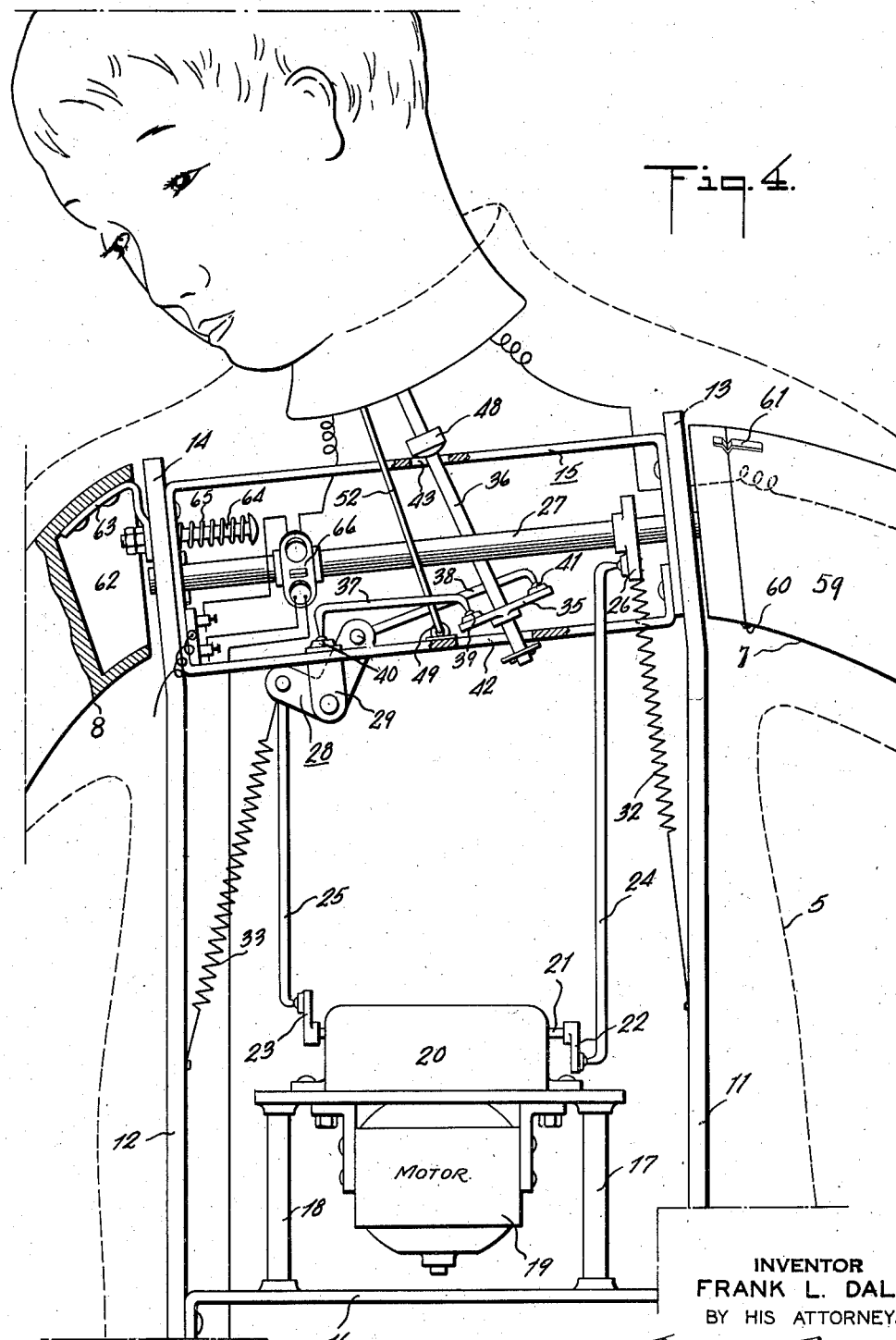

Feb. 24, 1942.  F. L. DALE  2,273,836
AUTOMATON MERCHANDISING DEVICE
Filed July 1, 1939   5 Sheets-Sheet 1
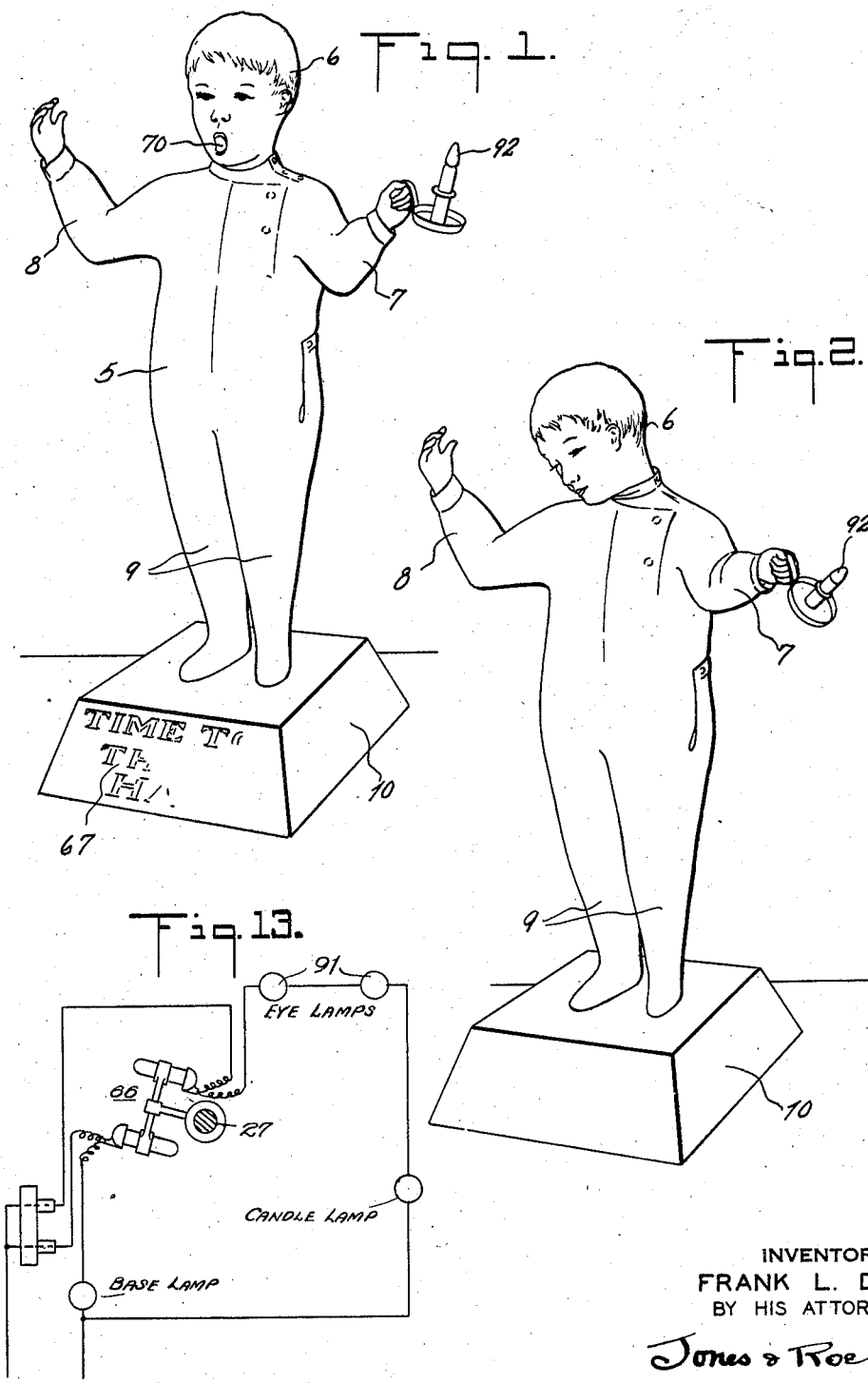
INVENTOR
FRANK L. DALE
BY HIS ATTORNEYS
Jones & Roe

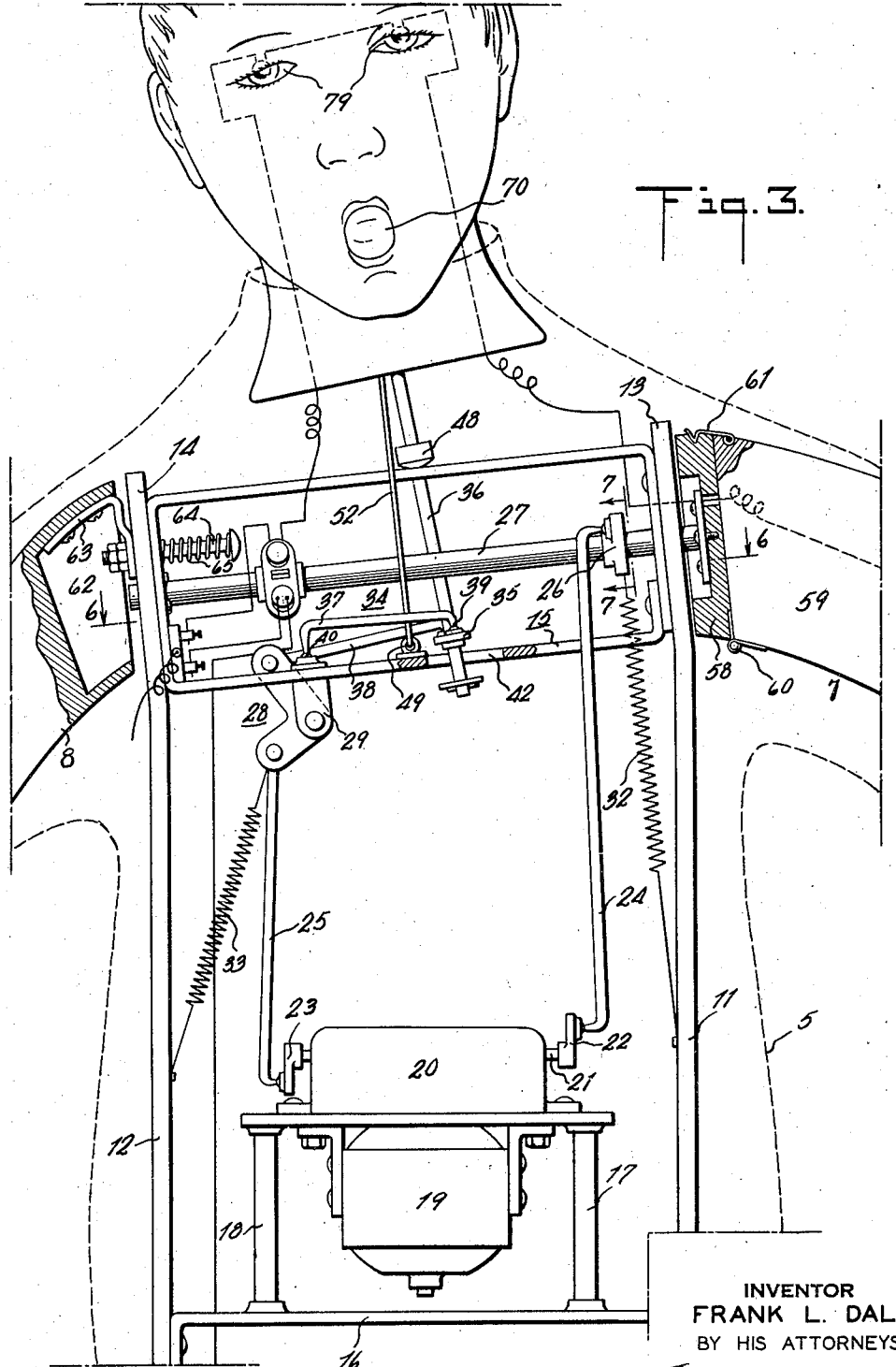

Feb. 24, 1942.　　　　F. L. DALE　　　　2,273,836
AUTOMATON MERCHANDISING DEVICE
Filed July 1, 1939　　　5 Sheets-Sheet 4
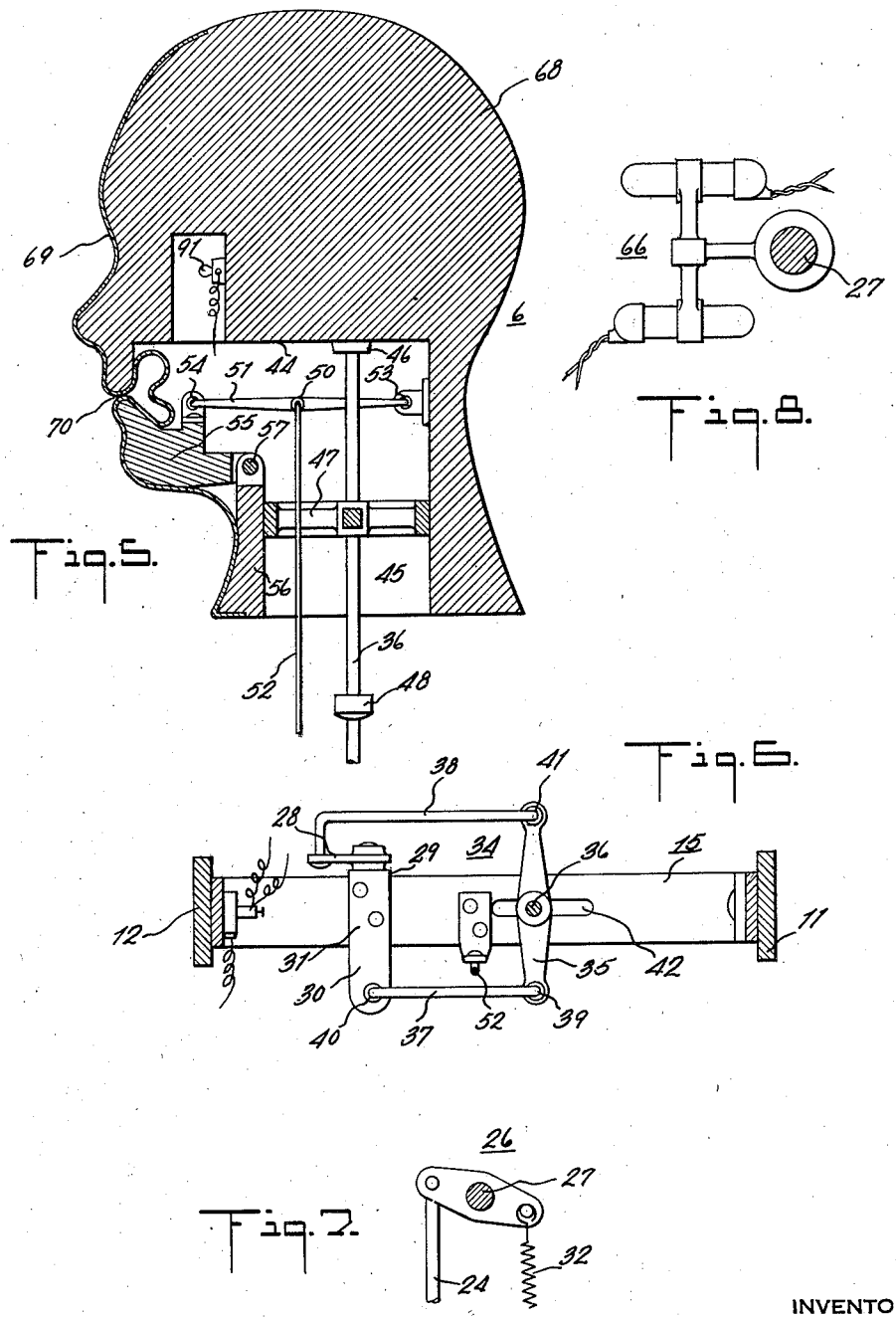
INVENTOR
FRANK L. DALE
BY HIS ATTORNEYS
Jones & Roe Feb. 24, 1942.　　　　F. L. DALE　　　　2,273,836
AUTOMATON MERCHANDISING DEVICE
Filed July 1, 1939　　　5 Sheets-Sheet 5
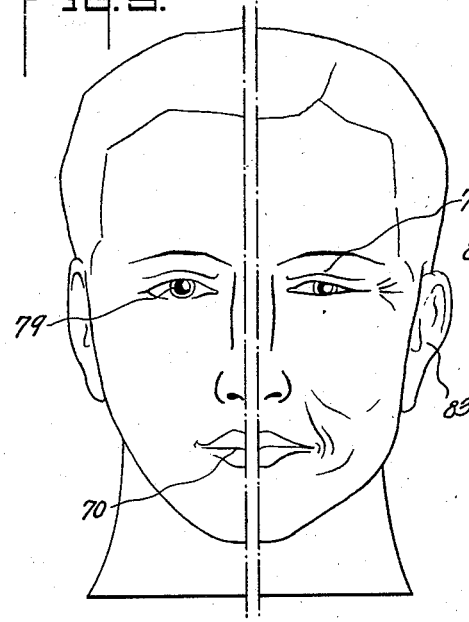
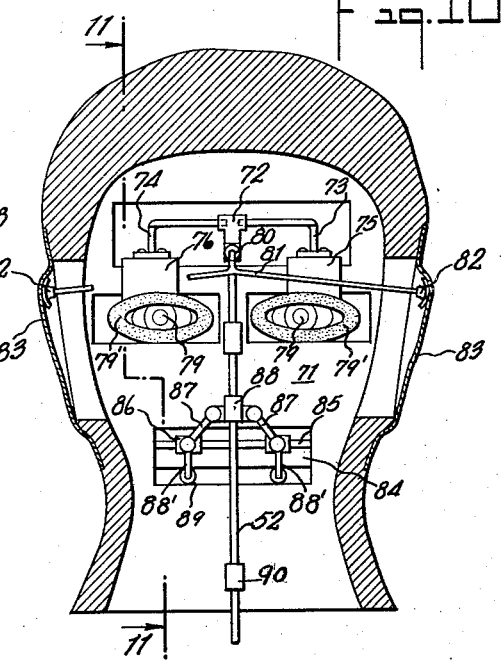
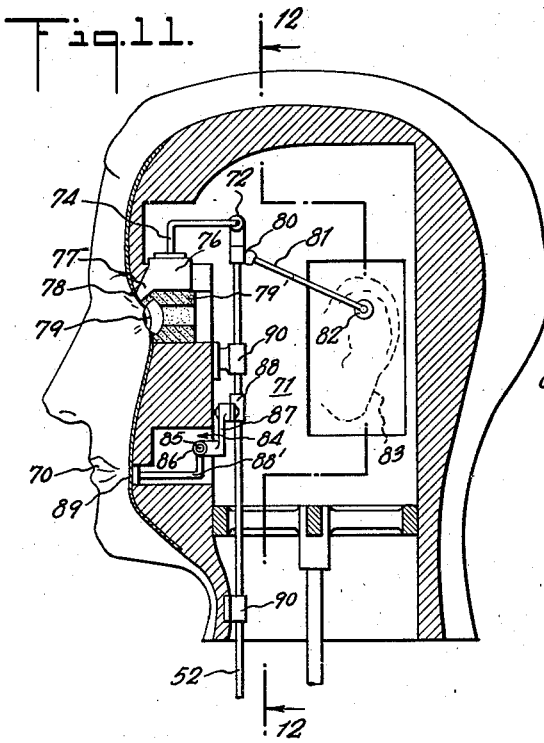
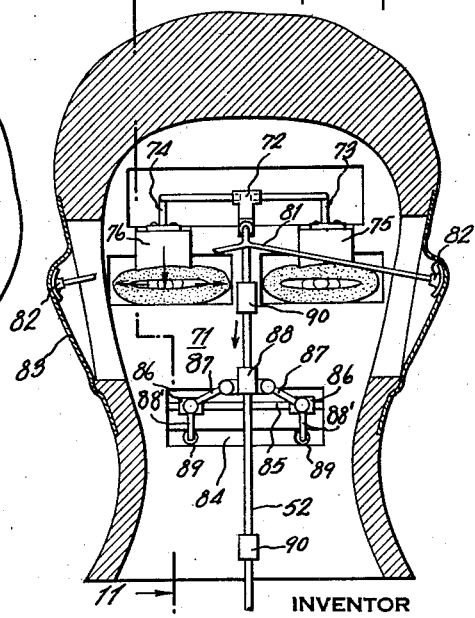
INVENTOR
FRANK L. DALE
BY HIS ATTORNEYS Patented Feb. 24, 1942

2,273,836

UNITED STATES PATENT OFFICE 2,273,836

AUTOMATON MERCHANDISING DEVICE

Frank L. Dale, New York, N. Y., assignor to Mechanical Man, Inc., New York, N. Y., a corporation of New York Application July 1, 1939, Serial No. 282,334

8 Claims. (Cl. 46—119)

The improvements comprise the provision of an automaton or robot simulating a human figure in which movements of the head and its organs of expression, as well as one arm, are so co-ordinated as to exhibit the figure in a state of drowsiness; and the provision of means for producing a smile, which includes movements of the integument of the head, eyelids, and mouth; the provision of means for selectively winking one or both eyes; the provision of means for moving the ears; and the provision of a unique combination of a base and an elastic integument therefor which, with the co-operation of suitable mechanisms, insures accurate reproduction of human expressions.

In the accompanying drawings, which illustrate one embodiment of the invention:

Fig. 1 is a perspective view of a figure garbed in pajamas, and imitating a yawn, Fig. 2 is a similar view of the figure in the act of falling asleep, Fig. 3 is an enlarged front elevation of the upper portion of the figure, as illustrated in Fig. 1 with pajamas removed to show internal operating mechanism, Fig. 4 is a similar elevation showing the position of internal mechanism which obtains when the figure occupies the posture exhibited in Fig. 2, Fig. 5 is a detailed vertical section of the head and operating parts, Fig. 6 is a top plan of the rocker frame and support removed from the body, taken partly in section along lines 6—6 of Fig. 3, Fig. 7 is a detailed side elevation of a rocker arm, taken partly in section along lines 7—7 of Fig. 3, Fig. 8 is a top plan of the mercurial switch, Fig. 9 is a front elevation of a modified form of the head with median vertical lines drawn therethrough to illustrate the change of expression resulting from actuation of the mechanism inside of the head, Fig. 10 is a vertical section of the head as viewed from the rear, with the eyes open, the mouth shut and the ears in repose, Fig. 11 is a section taken along lines 11—11 of Fig. 10.

Fig. 12 is a view similar to Fig. 10 showing the eye-lids partially closed, the corners of the mouth extended, and the ears distended, and Fig. 13 is a diagrammatic view of the electrical circuits employed.

The figure depicted is that of a child of full stature, clothed in pajamas, as appears in Figs. 1 and 2, and comprising a body 5, head 6, arms 7, 8, and legs 9 standing on a pedestal 10.

Noting particularly Figs. 3 and 4, it will be observed that body 5 encloses the operating mechanism which occupies a space therein between the waist and shoulders. This mechanism consists partially of a frame formed of a pair of parallel uprights 11, 12 which are slightly deflected at their upper extremities 13, 14, and between said extremities is fitted a yoke 15—also lying at a slight angle to the longitudinal axis of the body. The lower terminals of the uprights are connected by a transverse bar 16 carrying standards 17, 18, supporting a motor 19 and a housing 20, enclosing suitable reduction gearing. Shaft 21, a component of the reduction gearing, projects through opposite ends of the housing and carries terminal crank arms 22, 23, which operate vertical pitmen 24, 25. In turn, the upper end of pitman 24 engages the outer end of rocker arm 26 mounted on shaft 27, journalled in extremities 13, 14, of said uprights; while the upper terminal of the companion pitman 25 is pivoted to the lower part of the bell crank 28 which swings on the depending extension 29 of the angle plate 30, the upper portion 31 of the latter being fixed to the bottom of yoke 15. To promote ease of operation, counterbalance springs 32, 33, are interposed between the sides of the uprights and the inner end of rocker arm 26 and the lower end of bell crank 28.

A rocker frame is denoted generally at 34. It embraces a cross member 35 fixed to rod 36 and a pair of horizontal links 37, 38. Link 37 is swiveled at its connecting points 39, 40, while link 38 is swiveled at 41 and pivoted to the upper arm of the bell crank. Rod 36 extends upwardly through lower slot 42 and through upper slot 43 of yoke 15, and beyond the latter point where it is anchored to the ceiling 44 of the tubular neck portion 45 of the head 6, as at 46—a spider 47 being interposed in the tubular passage to insure rigidity of the rod and head connection. The rod 36 is further equipped with a bearing washer 48 about midway its length which avoids direct contact of the rod with the walls of slot 43.

Pivoted at its lower terminal 49 to the base of yoke 15 and at its upper terminal 50 to the cross member 51 is a mouth-actuating rod 52. The inner end of member 51 is pivoted at 53 and the outer end 54 thereof is pivoted to the posterior portion of jaw 55, which is likewise pivoted to the neck 56 at 57.

Arm 7 is carried by and movable with shaft 27. It includes a stub 58 to which said shaft is connected, and a major arm portion 59 with its pit hinged at 60 and a separable fastener 61 at the top, whereby arm portion 59 may be swung down from its normal posture to economize space, as when the complete figure is packed for shipment. Arm 8 is stationary and provided with a recess 62 housing an angle bracket 63, joined to extremity 14 of upright 12 by bolt 64, carrying coil spring 65, or succinctly expressed, a yieldable support is devised to accommodate objects of varying weights.

Also movable with shaft 27 is a mercurial electric switch 66, best shown in Fig. 8. It is connected in circuit with the eyes and a flash sign 67 on the pedestal.

The head 6 of the figure comprises a skull 68 of papier-mâché or equivalent material, and an elastic integument of rubber 69 or the like—see Figs. 5 and 9–12 inclusive—the integument when mechanically activated giving expression to or moving a specific organ. By way of example, in Fig. 5, when jaw 55 is actuated, mouth 70 opens and closes, thereby imitating a yawn. In Figs. 9–12 the scheme is carried still further. The vault 71 of the skull is enlarged, and rod 52 is extended and provided at its tip with a T-coupling 72 having lateral depressors 73, 74, with plungers 75, 76. The forward portion 77 of each plunger projects outwardly and downwardly and is affixed to the inner wall of the integument at 78 above an artificial eye 79, and the bottom of each plunger impinges against a cushion consisting of a ring of sponge rubber or similar substance 79', and in which the eye 79 is invested. Below coupling 72 and pivoted at 80 to rod 52 is a cross bar 81 which is styled an expander, and the outer terminals 82 of which engage ears 83. In line with the mouth 70 is a cavity 84 in which is mounted a transverse rod 85 carrying slidable bushings 86 connected by the articulated links 87 to the sleeve 88 on vertical rod 52—and extending downwardly and forwardly from the said bushings are a pair of angle arms 88' having their outer ends secured to the integument 69 at the opposite corners of the mouth, as at 89. Brackets 90 may be provided at the upper and lower extremities of the assembly to guide rod 52.

With particular reference to Figs. 1 to 7 inclusive, the operation of the invention proceeds in the following manner: With the figure as depicted in Fig. 1, that is, with the mouth 70 open in simulation of a yawn, the eyes 79 illuminated by the small incandescent lamps 91, and the left arm 7—the hand of which holds an electric candle 92—elevated, and assuming of course, that motor 19 has been energized, pitmen 24, 25, are reciprocated. Pitman 24 through rocker arm 26 oscillates shaft 27, whereupon arm 7 is lowered; and pitman 25 simultaneously oscillates rocker frame 34 and by means of rod 36 causes the head 6 to turn and move sideways and dip downwardly over the right shoulder, thus imitating a state of drowsiness, as noted in Figs. 2 and 4. Concurrently, mercurial switch 66 is turned with shaft 27 to break the circuit and thereby extinguish eye lights 91 and candle light 92, and due to the decreased radius of rod 52, mouth 70 is closed. As the motor continues, the various mechanical components are restored to their normal positions, and the cycle is repeated until such time as the power is shut off. If desired, the modified type of head disclosed in Figs. 9–12 inclusive, may be substituted for the head illustrated in Figs. 1–7, or any combination of expression-simulating devices as will appeal to the aesthetic taste, may be employed. For example, if the specific set up of modified form of head is substituted, it is manifest that the reciprocation of rod 52 will operate depressors 73, 74, and produce a contraction or expansion of the integument of the upper eye lids 78; by means of the expander 81 effect a movement of the ears 83; and that by the actuation of the articulated linkage disposed just behind the mouth, the mouth will stretch—see Fig. 9—and that all of these expressions will unite to produce an animated smile. It is also conceivable that by detaching either of the depressors 73, 74, one eye may be made to wink.

Obviously, to obtain the best possible results, the integument of the head, as well as the skull of any given figure may be embellished with colors, artistic lines and markings of diverse kinds.

I claim:

1. An apparatus of the character described comprising in combination, a figure having a body, a head pivoted with respect to said body so as to oscillate towards one shoulder on an axis which is inclined to the axis of the body, an arm connected to the body and adapted to be raised and lowered, and a motor for operating the head and arm.

2. An apparatus of the character described comprising in combination, a figure having a body, a head pivoted with respect to said body so as to oscillate towards one shoulder on an axis which is inclined to the axis of the body, said body provided with a mouth adapted to open and close, an arm connected to the body and adapted to be raised and lowered, and a motor for operating the head, mouth and arm.

3. An apparatus of the character described comprising in combination, a figure having a body, a head oscillatably mounted upon said body and provided with a mouth adapted to open and close, incandescent bulbs disposed behind the eyes, an arm connected to the body designed to be raised and lowered, an incandescent bulb held in the hand of said arm and operating means within the body actuating the head and arm and lighting and extinguishing the bulbs.

4. An apparatus of the character described comprising in combination, a figure including a body, an oscillatable head, an integument delineated like and snugly fitting the face, the integument in proximity to the mouth being movable, a motor within the body, connections between the motor and the head and the integument, and means induced by the oscillation of the head for producing a movement of the integument adjacent the mouth.

5. An apparatus of the character described comprising in combination, a figure including a body, an oscillatable head having a mouth, a frame within the body, a motor, a rod pivoted to the frame and the lower jaw of the mouth, connections between the head and the motor, and means whereby upon oscillation of the head the jaw is opened and closed.

6. An apparatus of the character described comprising in combination, a figure including a body, a head pivoted with respect to said body, a pair of arms, one of which is movable, a yoke arranged transversely of the body, a shaft carried by the yoke and connected to said movable arm, a rod extending from the head to a point within the body, a motor, and connections between the motor and said shaft and between the motor and said rod whereby upon operation of the motor the movable arm is raised and lowered and the head is oscillated on an axis which is inclined to the axis of the body.

7. An apparatus of the character described comprising in combination, a figure including a body, a head pivoted with respect to said body, a pair of arms, one of which is movable, a frame disposed within the body, a yoke arranged transversely of the frame, a shaft carried by the yoke and connected to said movable arm, a rod extending from the head to a point within the body, a motor, and connections between the motor and said shaft and between the motor and said rod whereby upon operation of the motor the movable arm is raised and lowered and the head is oscillated on an axis which is inclined to the axis of the body.

8. An apparatus of the character described, comprising in combination, a figure having a body, a head pivoted with respect to said body so as to oscillate towards one shoulder on an axis which is inclined to the axis of the body, and a motor, including connections for actuating the head.

FRANK L. DALE.